United States Patent
Chyou et al.

(10) Patent No.: US 7,422,821 B2
(45) Date of Patent: Sep. 9, 2008

(54) ON THE UNIFORMITY OF FLUID FLOW RATE FOR INTERCONNECTING PLATE FOR PLANAR SOLID OXIDE FUEL CELL

(75) Inventors: Yau Pin Chyou, Taipei (TW); Tsang Dong Chung, Taoyuan (TW); Dung Di Yu, Taoyuan (TW); Yung Neng Cheng, Taoyuan (TW)

(73) Assignee: Institute of Nuclear Energy Research, Lungtan, Taoyuan (TW)

( * ) Notice: Subject to any disclaimer, the term of this patent is extended or adjusted under 35 U.S.C. 154(b) by 166 days.

(21) Appl. No.: 11/161,848

(22) Filed: Aug. 19, 2005

(65) Prior Publication Data

US 2007/0042257 A1    Feb. 22, 2007

(51) Int. Cl.
*H01M 8/02* (2006.01)
*H01M 2/14* (2006.01)
*H01M 2/00* (2006.01)
*B32B 3/30* (2006.01)

(52) U.S. Cl. .............................. 429/38; 429/39; 429/34; 428/167

(58) Field of Classification Search .................. 429/38, 429/39, 34; 428/167
See application file for complete search history.

(56) References Cited

U.S. PATENT DOCUMENTS

| | | | |
|---|---|---|---|
| 5,108,849 A * | 4/1992 | Watkins et al. | 429/30 |
| 6,544,681 B2 | 4/2003 | McLean | 429/39 |
| 6,551,736 B1 * | 4/2003 | Gurau et al. | 429/39 |
| 6,746,515 B2 * | 6/2004 | Wegeng et al. | 95/96 |
| 7,272,941 B2 * | 9/2007 | TeGrotenhuis et al. | 62/93 |
| 2005/0064263 A1 * | 3/2005 | Goebel et al. | 429/34 |
| 2006/0099479 A1 * | 5/2006 | Friedman et al. | 429/35 |
| 2006/0228622 A1 * | 10/2006 | Cohen et al. | 429/101 |

* cited by examiner

*Primary Examiner*—Patrick Ryan
*Assistant Examiner*—Angela Martin
(74) *Attorney, Agent, or Firm*—Ming Chow; Sinorica, LLC

(57) ABSTRACT

A flat connecting plate designed for solid oxide fuel cell to improve the uniformity of fluid flow rate comprising a series of parallel ribs and grooves formed by the spaces between the ribs, the lengths of the ribs vary in accordance with the variation of the edge at proximity of fluid inlets, the widths of the grooves reduced in sequence from edges to center of the connecting plate, a series of diamond blocks placed at proximity of fluid outlet symmetrical to the center line of the connecting plate, and/or a series of fluid guide plates formed in parallel at the middle of two fluid inlets.

4 Claims, 4 Drawing Sheets

ON THE UNIFORMITY OF FLUID FLOW RATE FOR INTERCONNECTING PLATE FOR PLANAR SOLID OXIDE FUEL CELL

FIELD OF THE INVENTION

The present invention relates to improvement on the uniformity of fluid flow rate for flat connecting plate for solid oxide fuel cell. It particularly refers to a certain method capable of allowing two working fluids of the fuel cell to evenly and smoothly flow into the connecting plate, which distributes even voltage on the power generation substrate, effectively enhances total power generation, increases reliability of operation and improves efficiency of fuel application; as well as extending usable life of the fuel cell.

BACKGROUND OF THE INVENTION

The idea of using electrochemical reaction between hydrogen and oxygen to generate electrical power started in $19^{th}$ century; after that, scientists have continuously tried to put the technology of so-called "fuel cell" into practice and applied it in our daily life. Over the recent years, problems of scarce energy and environmental pollution caused from using fossil fuel have become more and more serious, a solution for energy problem demands for immediate attention. In view of this, the development of fuel cell technology will effectively relief energy problem that we confront at present. The fuel cell is a power-generating device with advantages of efficiency and cleanness; it is also an energy-transforming device capable of transforming chemical energy of fuel into electrical energy. From viewpoint of system efficiency, fuel cell has potential excellent advantages and its high efficient circulation with the combination of fuel cell and gas turbine is the utmost.

In recent year, due to various problems and pressures from environmental protection and insufficient energy, international organizations such as governments, vehicle industries, electrical power plants and energy industries have progressively focused on the development of fuel cell technology, where the same situation is encountered domestically. In view of these situations, the fuel cell technology can be addressed as one of the potential technology for clean energy in the future.

Up till now, the demonstrated products with application of Solid Oxide Fuel Cell (SOFC) as source of power has been introduced for almost a hundred years; yet during the evolving period of commercialization, lots of technical questions are still confronted and awaited for solution. Since 1960's, relevant companies kept developing the technology of tubular SOFC and SOFC power generating system, which could be seen as source of technical evolution reopened by the industries in recent history. During the mid of 1980's, fabrication technology of flat plate SOFC achieved an outbreak and made the cost of production more competitive than it was before. Therefore, most companies or research institutes (scattered around USA, Europe, Japan and Australia region) that devoted in research and development of SOFC technology at later stage focused on the flat plate system.

In the development of fuel cell over recent years, Proton Exchange Membrane Fuel Cell (PEMFC) and Direct Methanol Fuel Cell (DMFC) were specialized in the low temperature field, while Molten Carbonate Fuel Cell (MCFC) and Solid Oxide Fuel Cell (SOFC) were specialized in the high temperature field. Among them, the flat plate SOFC has higher potential and the reason besides advantages of high efficiency and low pollution for general fuel cell is that: (1) It has higher working temperature, which can perform CHP generation via heat technology and obtain over 80% of CHP efficiency. (2) The electrolyte is solid and has no problems such as evaporation, leakage and corrosion; thus the operational life is long and the design of appearance is more flexible. (3) By execution of electrochemical reaction under high temperature, the cell itself has internal ability of re-arrangement; thus it can directly use natural gas, coal gas or other hydrocarbons as fuel. (4) The remaining heat emitted is the unused fuel, which can combine with gas turbine to form a mixed system of circulative power generation and improve total efficiency of power generation, as well as reduction on environmental contamination. Since the operating temperature is higher however, requirements on material are stricter and the open circuit voltage is lower. At present, medium SOFC with working temperature between 600° C.-800° C. is under active international development to overcome the above-mentioned problem.

The SOFC mainly consists of an anode, cathode, solid oxide electrolyte and bipolar connecting plates (which are also named as "bipolar plates" or "interconnects"). The connecting plates are the most essential elements of SOFC, of which materials are mainly divided into ceramics and metals. The main function of connecting plate is to connect anode and cathode of adjacent cell, which also acts as physical barrier for protecting the recovered environment of air electrode material isolating fuel electrode terminal; as well as protecting oxidized environment of fuel electrode material isolating air electrode terminal.

The illustration of assembling 4-cell-stack is shown in FIG. 1 with a cell stack sealed with ceramic glass. There are some simplifications in the figure; firstly, we replace the shape of combination between Positive electrode—Electrolyte—Negative electrode plate (PEN) and the frame with a flat plate, so there is no problem of electrode connection, where mesh can be removed together. The fuel enters from inlet at top left side and then directly passes two connecting holes for fuel entrance on left side of top frame. Part of the fuel passes channel above the top connecting plate and exits from middle hole on right hand side of the connecting plate. Other part of fuel passes channel above second, third connecting plate and lower plate, which then connects lower right hand side of cell stack via middle hole on right hand side and finally exits. The air works in opposite manner; it enters from entrance on top right hand side, passes channel below upper plate, as well as first, second and third connecting plate to middle hole on right hand side of each frame, and then the air finally connects with draining pipe at lower left hand side of cell stack and exits. The center ventilation hole on right hand side of top frame must be closed for preventing fuel to backflow upwards and mix with the air. The ventilating holes on both sides of right hand side of bottom frame must also be closed to prevent air passes and direct mixes with the fuel.

Nowadays, metal connecting plates have become the main stream of SOFC, and these can be categorized into two major types, namely chromium base and iron base. Chromium base is the product at early stage; it allows higher operating temperature with higher cost, fabrication difficulty and worse ductility comparing to iron base. In view of this, the present trend of development is mainly based on iron base products. In addition, if the operating temperature of SOFC is lowered to 700° C., ferrite stainless steel can be used as material of connecting plate and this will dramatically reduces the cost.

Other than satisfying excellent material properties such as heat conductivity, electrical conductivity, corrosion resistance and oxidation or reduction resistance, the connecting plate still needs another important function, i.e. to guide fuel and air for even distribution in the reaction area. Whether the reacted gas can evenly flow within the channel or not will influence efficiency of power generation, and this is also the main factor for determining the distribution evenness of current density and temperature on the ceramic substrate. Therefore, the design of bipolar plate channel and the field analysis within the channel are very significant works in the process of development for fuel cell technology.

The U.S. Pat. No. 6,544,681, Apr. 8, 2003 (CORRUGATED FLOW FIELD PLATE ASSEMBLY FOR A FUEL CELL) illustrates a type of channel field with square wave shape channel, where the channel fields consist of two sides of a channel plate to provide channels for fuel and oxides respectively. Fluids on top and bottom sides may flow interactively via a coupling device and then generate electrical power with reaction. The above-mentioned patent focuses on interaction of the two fluids, which is clearly different from the object of the present invention to control the evenness of flow speed of the two fluids on the connecting plate. Furthermore, the U.S. Pat. No. 6,296,964, Oct. 2, 2001 (ENHANCED METHANOL UTILIZATION IN DIRECT METHANOL FUEL CELL) illustrates a type of channel field with square wave shape, which has a conducting plate at space of 90 degrees between each other; the plate is made with membrane-electrode and contacts with channels of both sides separately. The purpose is to control rate of methanol infiltration in the fuel cell and increase utilization efficiency of methanol, which is different from the object of the present invention, namely the focus on control even flow speed of the two fluids with connecting plate. In the present invention, interpretation was made by means of reverse flow (flow direction of fuel is opposite to air); since this patent focuses on channel design of connecting plate, the goal and scope of patent are different.

The Germany patent No. DE10039024A1 is a method of assembling SOFC stack and it is a cell stack sealed with glass ceramic. The flow direction is designed in co-flow fashion, i.e. the flow direction of fuel and air is consistent. The design of connecting plate uses ribs and grooves to form the channel field. However, it has not designed the number of inlets/outlets and there is no description on detail design of the flow area.

The structural design of connecting plate for general SOFC only considers number of inlets/outlets for the fluid, arrangement of location and design of geometric shape, where no detail consideration is given on even flow speed of working fluid within channel of connecting plate. In the design of connecting plate with internal manifold generally, the less the number of fluid inlets and outlets, the worse the even flow rate of fluid in each channel and vice versa, but the overall design of will be complicated and the production cost will increase. Therefore, the number of individual fluid inlets and outlets rarely exceeds three (including three). FIG. 2 shows the common SOFC design of channel for connecting plate with internal manifolds, which is the typical design of two inlets and one outlet. The fluid distribution in the channel is not very even; the flow rate of fluid at channel between two inlets is higher, but the flow rate of fluid at external channel on both sides is lower. In order to improve unevenness of flow speed, it is necessary to modify design of the channel to enhance overall efficiency of power generation with fuel cell.

SUMMARY OF THE INVENTION

The non-uniformity of flow speed in channels of a connecting plate may be resolved in two aspects, firstly, unevenness incurred in the source portion may be alleviated by utilizing flow guide plates at the proximity of inlets to smooth flow rate distribution from inlets to the front ends of channels; secondly, to enlarge the widths of channels for reducing the pressure drop within the channels, or, to extend the lengths of ribs toward the proximity of inlets which may reduce the pressure drop due to disturbance occurred from the fluid inlets toward channel exits, therefore, speed up the flow speed in the channels. On the contrary, to increase the distance of flow passage from channel exits to fluid outlets by adding diamond blocks at the proximity of outlets may effectively slow down the fluid flow rate within the channels. The essential object of the present invention to provide a flat connecting plate to improve the uniformity of flow speed has been proved effective through experiments and analyses.

The main object of the present invention is to provide a flat connecting plate to improve the uniformity of fluid flow rate of fuel and oxidant.

Further object of the present invention is to provide a flat connecting plate comprising a fluid field having a series of parallel ribs and grooves formed by the spaces between the ribs, wherein the widths of the grooves are reduced in sequence from edges to center of the connecting plate.

Further object of the present invention is to provide a flat connecting plate comprising a fluid field having a series of parallel ribs and grooves formed by the spaces between the ribs, wherein the lengths of the ribs vary in accordance with the variation of the edge at the proximity of fluid inlets, and/or provide a series of fluid guide plates at the middle of two fluid inlets.

Further object of the present invention is to provide a flat connecting plate comprising a fluid field having of a series of parallel ribs and grooves formed by the spaces between the ribs, wherein a series of diamond blocks are placed at the proximity of fluid outlet symmetrical to the center line of the connecting plate.

DETAILED DESCRIPTION OF PREFERRED EMBODIMENTS

Figure 1:
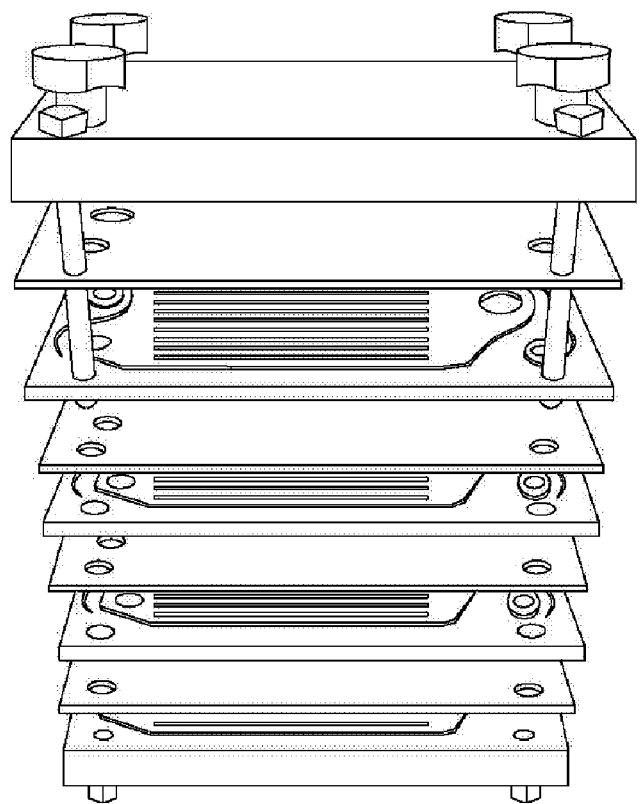
FIG. 1 is a prior art SOFC fuel stack uses flat connecting plate.
Figure 2:
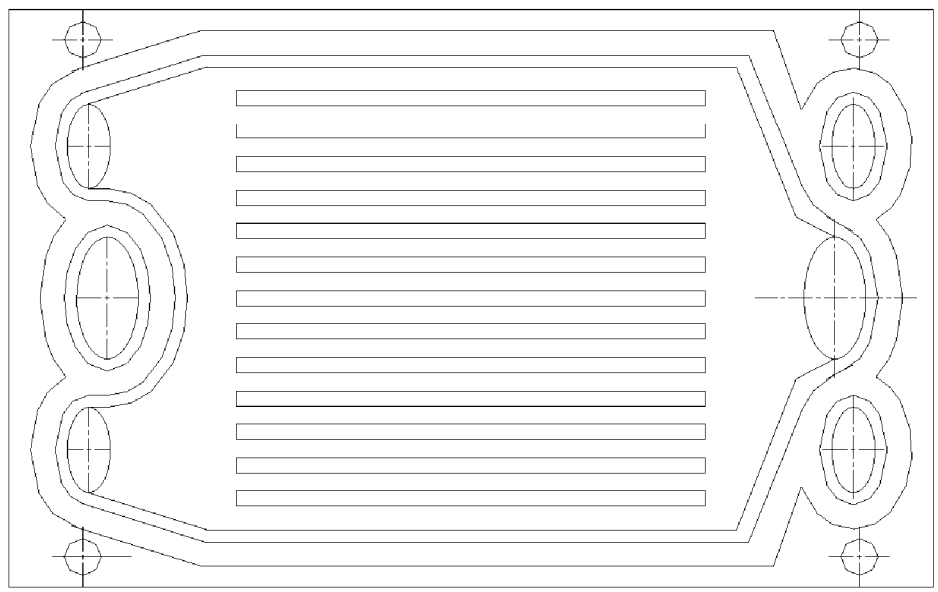
FIG. 2 is a prior art SOFC uses internal manifold type connecting plate.
Figure 3A:
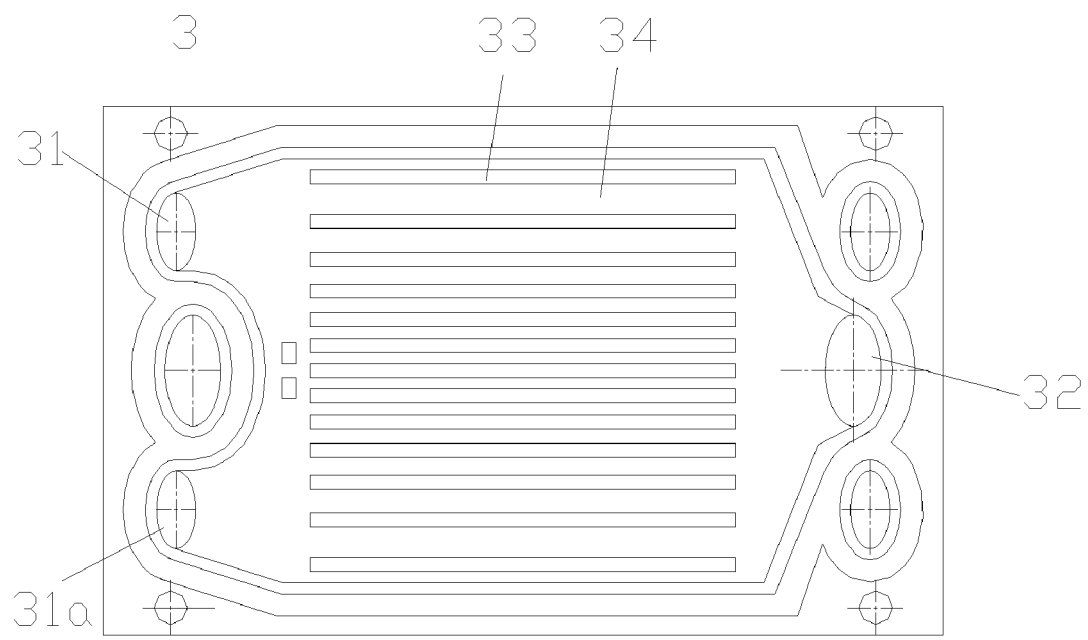
FIG. 3a is a first embodiment of fuel cell connecting plate design of the present invention.

In FIG. 3a, it illustrates a first embodiment of fuel cell connecting plate design 3 of the present invention having two inlets 31, 31a and one outlet 32, a series of long ribs 33 furnished between the inlets 31, 31a and outlet 32, and grooves 34 formed by spaces between ribs 33, wherein the width between spaces are reduced in sequence from the edges of the connecting plate to the center area.

Figure 3B:
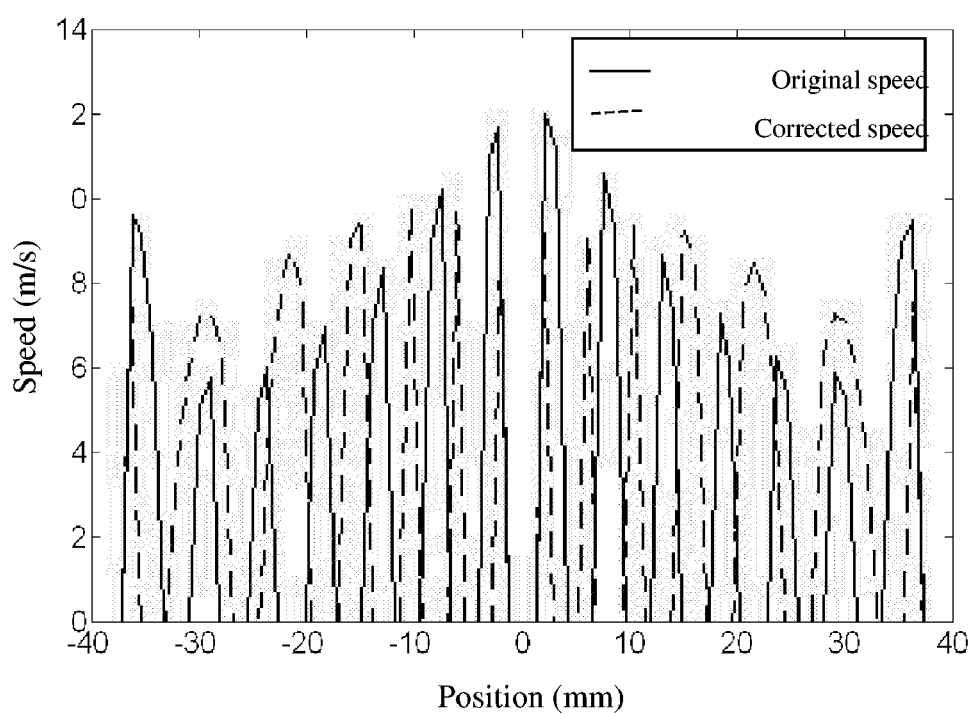
FIG. 3b is a fluid flow rate calculation and comparison between the fuel cell connecting plate design of FIG. 3a and prior art.

In FIG. 3b, it illustrates a fluid flow rate calculation and comparison between the fuel cell connecting plate design 3 of FIG. 3a and prior art, wherein the fluid flow rate in the outside portion of grooves 34 of the connecting plate 3 is significantly enhanced while the fluid flow rate in the center portion is restricted, as a result, the uniformity of fluid flow rate (dotted lines) in the grooves with width reduced in sequence from edges to center of the connecting plate is better than the base case with equal width of grooves (solid lines).

Figure 4A:
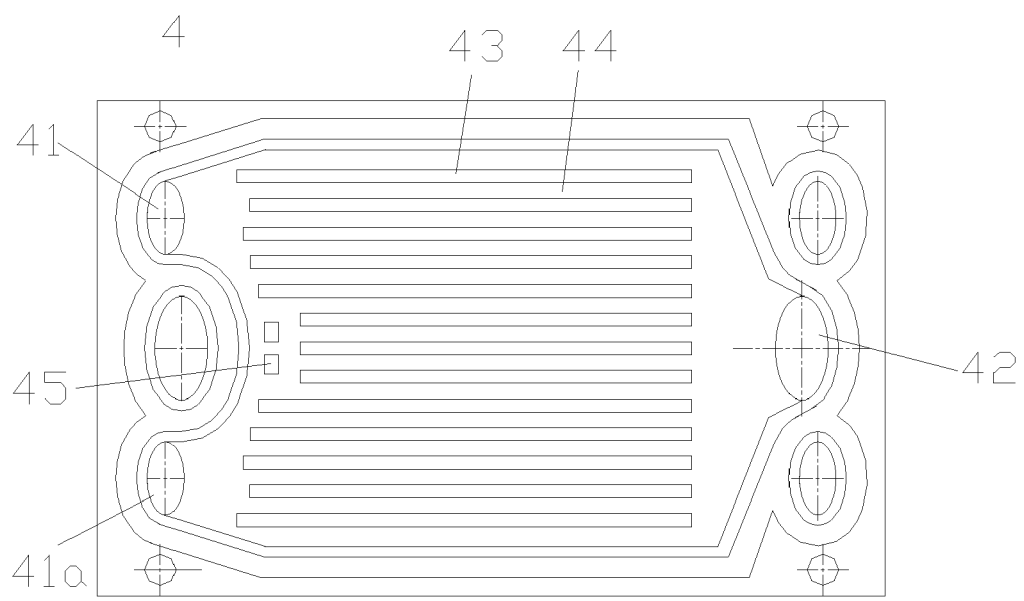
FIG. 4a is a second embodiment of fuel cell connecting plate design of the present invention.

In FIG. 4a, it illustrates a third embodiment of fuel cell connecting plate design 4 of the present invention having two inlets 41, 41a and one outlet 42, a plurality of long ribs 43 furnished between the inlets 41, 41a and outlet 42, and grooves 44 formed by spaces between ribs 43, wherein the lengths of the ribs 43 vary in accordance with the variation of the edge at proximity of fluid inlets 41, 41a, and/or provide a plurality of fluid guide plates 45 in parallel at the middle of two fluid inlets 41, 41a.

Figure 4B:
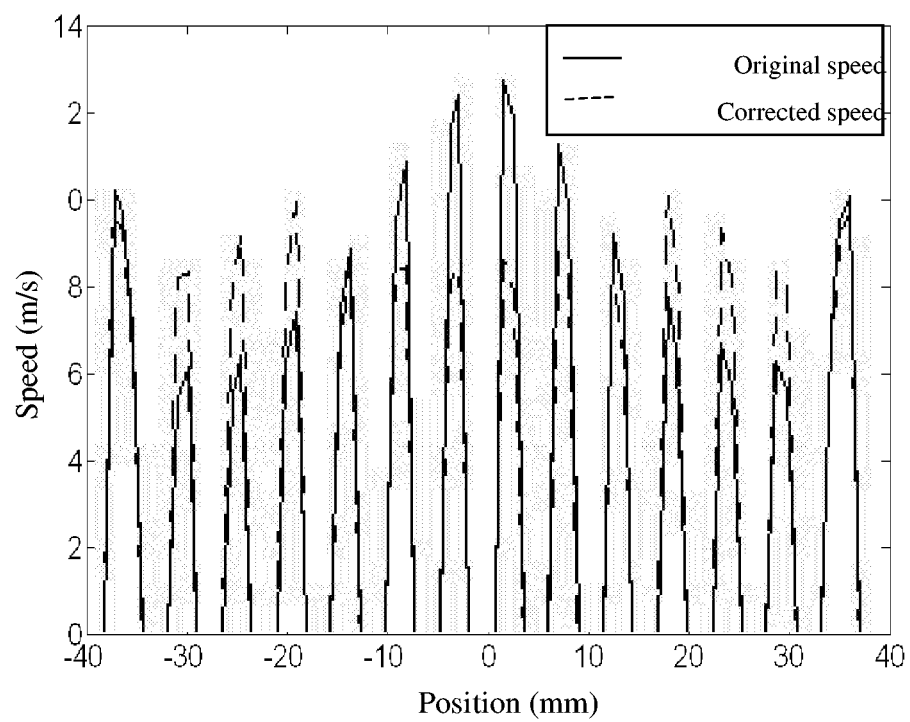
FIG. 4b is a fluid flow rate calculation and comparison between the fuel cell connecting plate design of FIG. 4a and prior art.

In FIG. 4b, it illustrates a fluid flow rate calculation and comparison between the fuel cell connecting plate design 4 of FIG. 4a and prior art, wherein the evenness of fluid flow rate in the grooves 44 of the connecting plate 4 is significantly improved. It is noted that the change in length of ribs, while maintaining the contact area between the connecting plate and PEN on the frame unchanged, doesn't affect the amount of area of electricity generation in fuel cell.

Figure 5A:
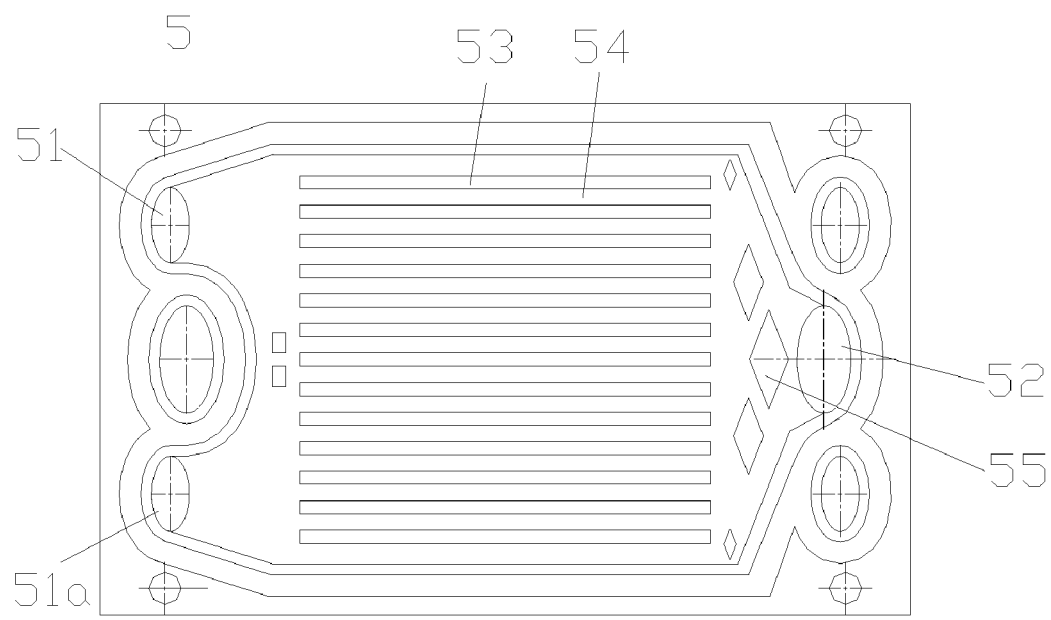
FIG. 5a is a third embodiment of fuel cell connecting plate design of the present invention.

In FIG. 5a, it illustrates a third embodiment of fuel cell connecting plate design 4 of the present invention having two inlets 51, 51a and one outlet 52, a plurality of long ribs 53 furnished between the inlets 51, 51a and outlet 52, and grooves 54 formed by spaces between ribs 53, wherein a plurality of diamond blocks 55 are furnished at proximity of fluid outlet 52 symmetrical to the center line of the connecting plate 5, not only eligible to improve evenness of fluid flow rate but also reduce touch up work required at that area.

Figure 5B:
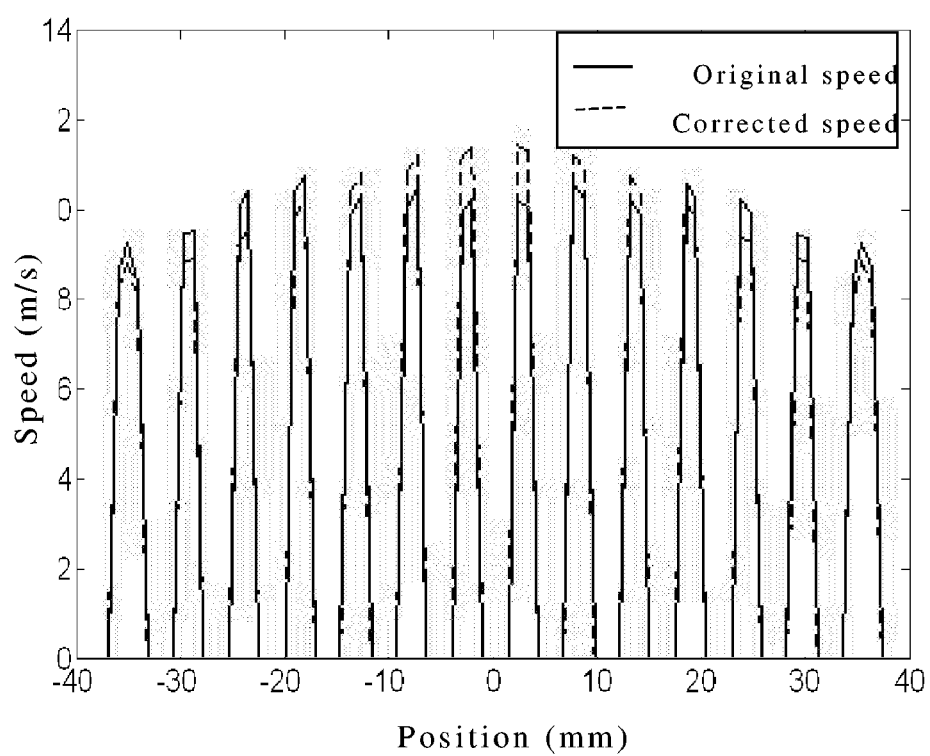
FIG. 5b is a fluid flow rate calculation and comparison between the fuel cell connecting plate design of FIG. 5a and prior art.

In FIG. 5b, it illustrates a fluid flow rate calculation and comparison between the fuel cell connecting plate design 5 of FIG. 5a and prior art, wherein the evenness of fluid flow rate in the grooves 54 of the connecting plate 5 (dotted lines) is significantly improved with furnished diamond blocks 55 in comparison with the connecting plate without diamond blocks 55 (solid lines).

As aforementioned, the advantages of the flat connecting plate for solid oxide fuel cell of the present invention include the improvement on evenness of fluid flow rate, smooth flow of working fluids and stable generation efficiency.

Various additional modifications of the embodiments specifically illustrated and described herein will be apparent to those skilled in the art, particularly in light of the teachings of the present invention. The invention should not be construed as limited to the specific form and examples as shown and described, but instead is set forth in the following claims.

What is claimed is:

1. A flat connecting plate to improve the uniformity of fluid flow rate of fuel and oxidant comprising:
    a plurality of inlets;
    one outlet;
    a first surface and a second surface both having a fluid field of a series of parallel ribs and grooves formed by spaces between the ribs, wherein the widths of the grooves are reduced in sequence from edges to center of the connecting plate to enhance fluid flow rate in outside portion of grooves while restrict the fluid flow rate at center portion of the grooves; and
    the series of parallel ribs and grooves are aligned in a direction from the inlets to the outlet.

2. The flat connecting plate of claim 1, wherein the lengths of the ribs vary in accordance with the variation of the edge at the proximity of fluid inlets, and/or provide a series of fluid guide plates at the middle of two fluid inlets.

3. The flat connecting plate of claim 1 wherein the fluid field is eligible for a connecting plate used for co-flowing fuel and air.

4. A flat connecting plate to improve the uniformity of fluid flow rate of fuel and oxidant comprising:
    a plurality of inlets;
    one outlet;
    a first surface and a second surface both having a fluid field of a series of parallel ribs and grooves formed by spaces between the ribs, wherein the widths of the grooves are reduced in sequence from edges to center of the connecting plate to enhance fluid flow rate in outside portion of grooves while restrict the fluid flow rate at center portion of the grooves, and the series of parallel ribs and grooves are aligned in a direction from the inlets to the outlet; and
    a series of diamond blocks are placed at proximity of the fluid outlet symmetrical to the centerline of the connecting plate.

* * * * *